United States Patent
Dashevskiy

(10) Patent No.: US 9,939,802 B2
(45) Date of Patent: Apr. 10, 2018

(54) AUTOMATED CONFLICT RESOLUTION MANAGEMENT

(71) Applicant: Dmitriy Dashevskiy, Nienhagen (DE)

(72) Inventor: Dmitriy Dashevskiy, Nienhagen (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 470 days.

(21) Appl. No.: 14/280,009

(22) Filed: May 16, 2014

(65) Prior Publication Data
US 2015/0331411 A1    Nov. 19, 2015

(51) Int. Cl.
G05B 19/402    (2006.01)
G05B 19/4063    (2006.01)
E21B 44/00    (2006.01)
E21B 47/12    (2012.01)

(52) U.S. Cl.
CPC ............ *G05B 19/402* (2013.01); *E21B 44/00* (2013.01); *E21B 47/124* (2013.01); *G05B 19/4063* (2013.01); *G05B 2219/32273* (2013.01); *G05B 2219/45129* (2013.01); *G05B 2219/49001* (2013.01)

(58) Field of Classification Search
None
See application file for complete search history.

(56) References Cited

U.S. PATENT DOCUMENTS

| | | | |
|---|---|---|---|
| 6,571,147 B1 * | 5/2003 | Kashihara | G06Q 10/04 700/100 |
| 8,121,971 B2 | 2/2012 | Edwards et al. | |
| 8,131,510 B2 | 3/2012 | Wingky et al. | |
| 2004/0140112 A1 | 7/2004 | Salminen et al. | |
| 2008/0046437 A1 | 2/2008 | Wood | |
| 2011/0155461 A1 | 6/2011 | Hutniak et al. | |
| 2012/0059521 A1 | 3/2012 | Iversen et al. | |
| 2012/0316787 A1 * | 12/2012 | Moran | E21B 44/00 702/9 |
| 2014/0025413 A1 * | 1/2014 | Yeager | G06Q 10/0631 705/7.12 |
| 2014/0083765 A1 * | 3/2014 | Hoult | E21B 44/00 175/24 |
| 2014/0143376 A1 * | 5/2014 | Beaulac | H04L 67/2828 709/217 |

(Continued)

FOREIGN PATENT DOCUMENTS

WO    2013082498 A2    6/2013

OTHER PUBLICATIONS

SA First Examination Report for SA Application No. 115360544, dated Dec. 22, 2015, pp. 1-6.

*Primary Examiner* — Tuan Dao
(74) *Attorney, Agent, or Firm* — Cantor Colburn LLP

(57) ABSTRACT

A system, a method of performing conflict management in a system, and a conflict manager in a system are described. The system includes two or more controllers to issue corresponding two or more commands to one or more actors to accomplish a respective activity, the actor being one of a tool to be controlled based on the command, an application to be executed based on the command, or an operator to be instructed based on the command. The system also includes a conflict manager, implemented by a processor, to resolve a conflict with one of the two or more commands or between the two or more commands.

20 Claims, 5 Drawing Sheets

(56) References Cited

U.S. PATENT DOCUMENTS

2015/0278734 A1* 10/2015 Grant .................. G06Q 10/06
　　　　　　　　　　　　　　　　　　　　　705/7.23
2016/0073333 A1* 3/2016 Wei ..................... H04W 48/18
　　　　　　　　　　　　　　　　　　　　　455/552.1

* cited by examiner

AUTOMATED CONFLICT RESOLUTION MANAGEMENT

BACKGROUND

Systems with many components, such as those used in downhole exploration and production efforts, involve the deployment of a variety of sensors and tools. The sensors may provide information about the downhole environment by providing measurements of temperature, density, and resistivity, among many other parameters. This information may be used to control such tools as the drill bit, steering head, or bottomhole assembly.

SUMMARY

According to an embodiment of the invention, a system includes two or more controllers configured to issue corresponding two or more commands to one or more actors to accomplish a respective activity, the actor being one of a tool to be controlled based on the command, an application to be executed based on the command, or an operator to be instructed based on the command; and a conflict manager, implemented by a processor, configured to resolve a conflict with one of the two or more commands or between the two or more commands.

According to another embodiment, a method of performing conflict management in a system includes identifying, using a processor, two or more commands issued by corresponding two or more controllers to an actor to accomplish a respective activity, the actor being one of a tool to be controlled based on the command, an application to be executed based on the command, or an operator to be instructed based on the command; and resolving a conflict, using the processor, between the two or more commands directed to the actor based on a specified strategy.

According to yet another embodiment, a conflict manager in a system including two or more controllers that issue corresponding two or more commands to control an actor to accomplish a respective activity includes an input interface configured to receive the two or more commands to control the actor, the actor being one of a tool to be controlled based on the command, an application to be executed based on the command, or an operator to be instructed based on the command; and a processor configured to resolve a conflict between the two or more commands based on a specified strategy.

BRIEF DESCRIPTION OF THE DRAWINGS

Referring now to the drawings wherein like elements are numbered alike in the several Figures.

DETAILED DESCRIPTION

As noted above, systems with many components may involve the use of a variety of sensors and tools. When more than one activity is undertaken in the system at a given time, conflicts may arise based on contradictory commands being sent to a given actor (tool, application, operator) for each of the activities. For example, one type of conflict may arise when two different downhole activities involve control of the drill bit, and each activity provides different parameters to which the drill bit is to be controlled. Another type of conflict may involve conflicting goals for the same actor (e.g., continue use of a tool or pull out the tool for maintenance). Yet another type of conflict may involve an actor receiving a command that is outside its capability or safety range. Embodiments of the systems and methods described herein relate to the resolution of a variety of such conflicts.

Figure 1:
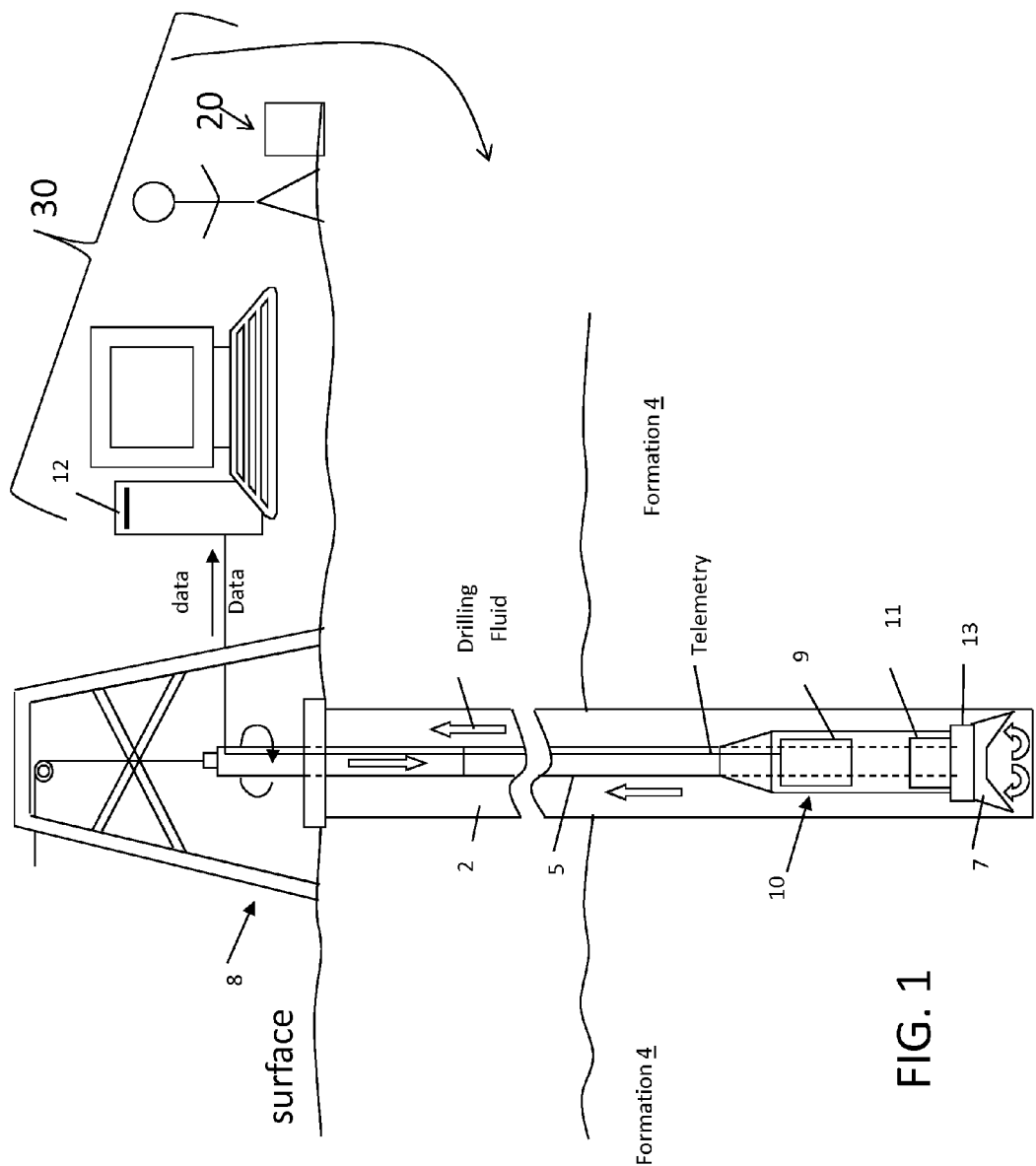
FIG. 1 is a cross-sectional view of a downhole system according to an embodiment of the invention.
Figure 2:
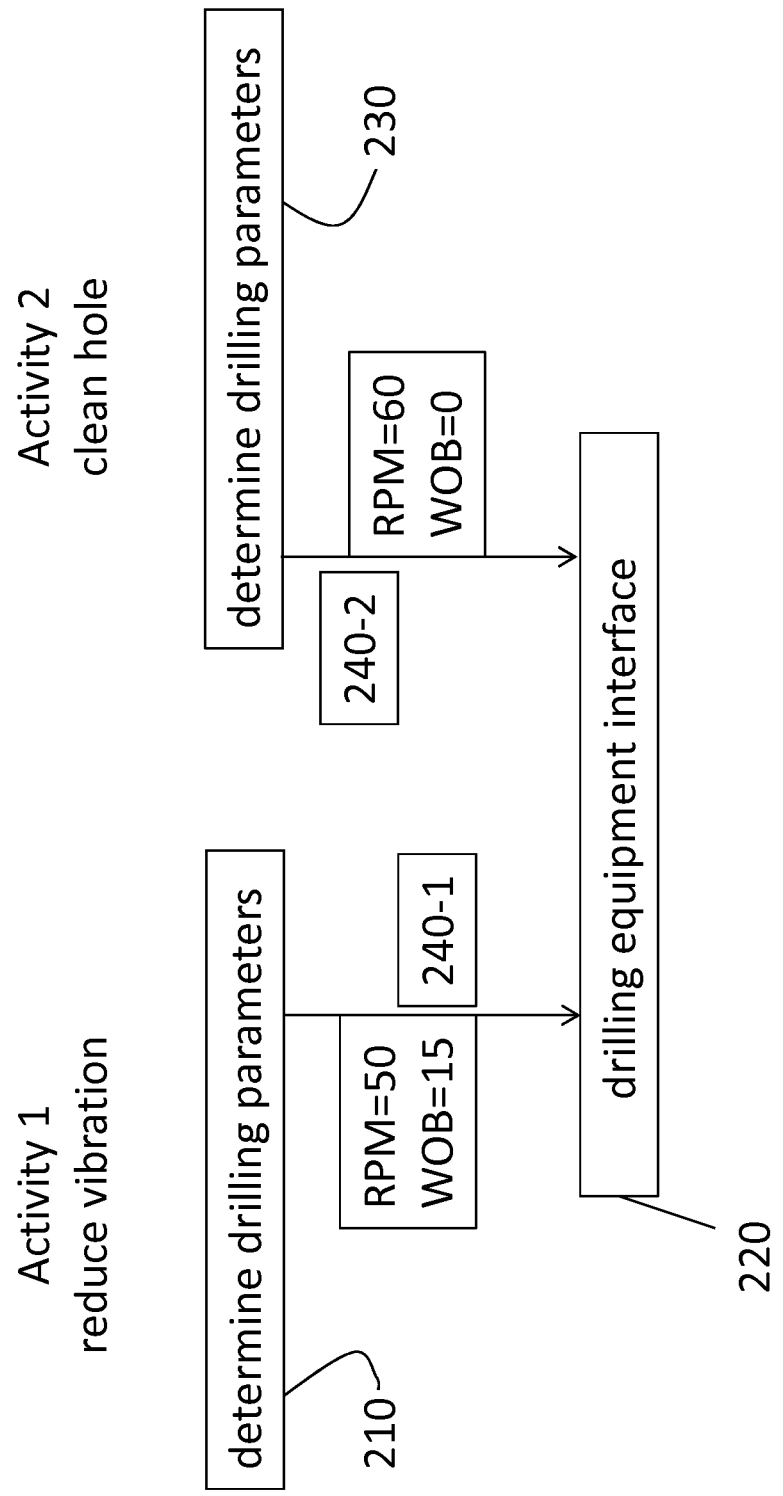
FIG. 2 illustrates exemplary activities according to embodiments of the invention.

FIG. 1 is a cross-sectional view of a downhole system according to an embodiment of the invention. The system and arrangement shown in FIG. 1 is one example to illustrate the downhole environment. While the system may operate in any subsurface environment, FIG. 1 shows downhole tools 10 disposed in a borehole 2 penetrating the earth 3. The downhole tools 10 are disposed in the borehole 2 at a distal end of a carrier 5, as shown in FIG. 1, or in communication with the borehole 2, as shown in FIG. 2. The downhole tools 10 may include measurement tools 11 and downhole electronics 9 configured to perform one or more types of measurements in an embodiment known as Logging-While-Drilling (LWD) or Measurement-While-Drilling (MWD). According to the LWD/MWD embodiment, the carrier 5 is a drill string that includes a bottomhole assembly (BHA) 13. The BHA 13 is a part of the drilling rig 8 that includes drill collars, stabilizers, reamers, and the like, and the drill bit 7. The measurements may include measurements related to drill string operation, for example. A drilling rig 8 is configured to conduct drilling operations such as rotating the drill string and, thus, the drill bit 7. The drilling rig 8 also pumps drilling fluid through the drill string in order to lubricate the drill bit 7 and flush cuttings from the borehole 2. Raw data and/or information processed by the downhole electronics 9 may be telemetered to the surface for additional processing or display by a computing system 12. Drilling control signals may be generated by the computing system 12 and conveyed downhole or may be generated within the downhole electronics 9 or by a combination of the two according to embodiments of the invention. The downhole electronics 9 and the computing system 12 may each include one or more processors and one or more memory devices. The borehole 2 may be vertical as shown in FIG. 1 or may be formed horizontally or at an angle in embodiments related to directional drilling. For explanatory purposes and because the embodiments detailed herein are not limited by any particular tool or actor, the downhole tools 10, drilling system (including drill bit 7), and any other downhole or surface equipment that can be controlled are referred to generally as tools 20. In addition, the tools 20, any applications (e.g., executed by downhole electronics 9 or the computing system 12), and human operators are referred to generally as actors 30 The exemplary downhole system of FIG. 1 represents an environment in which conflicting commands or instructions may be issued to an actor 30 of a given component (e.g., the drilling system). That is, controllers 240 (FIG. 2) (generally referring to a human operator or application that generates a command to carry out an activity) may give conflicting commands to actors 30 (e.g., tools 10 downhole or at the surface, human operators). Embodiments of the conflict manager 300 (FIG. 3) discussed below resolve such conflicting commands or instructions.

FIG. 2 illustrates exemplary activities according to embodiments of the invention. One of the exemplary activities (Activity 1) is to reduce vibration. This activity includes controlling drilling and, therefore, determining drilling parameters (block 210) may be part of the activity. As an example, it may be determined that drill speed in revolutions per minute (RPM) should be 50 and weight on bit (WOB), typically measured in thousands of pounds of downward force on the drill bit, should be 15. The controller 240-1 responsible for carrying out the drilling control of Activity 1 would provide the parameters to control the drilling to a drilling equipment interface 520. Turning to another exemplary activity (Activity 2) of cleaning the hole (borehole 2), one of the tasks involved in cleaning the hole also includes controlling drilling. The drilling parameters needed for Activity 2 are determined (block 230). For example, it may be determined that the drill speed should be 60 RPM and have a WOB of 0. The controller 240-2 responsible to carry out the drilling control as part of Activity 2 provides the parameters (60 RPM and 0 WOB) to the drilling equipment interface 520. If Activity 1 and Activity 2 were undertaken independently at different times, the two different activities would not present an issue. However, when Activity 1 and Activity 2 are implemented at the same time (the controllers 240-1 and 240-2 responsible for carrying out control of drilling for Activity 1 and for Activity 2 are both issuing commands at the same time), a conflict arises due to the conflicting parameters at the drilling equipment interface 220 (interface to actors 30). The drilling equipment interface 220 receives contradictory instructions to control drilling (drill speed of both 50 and 60 RPM and WOB of 15 and 0).

Other exemplary conflicts arise for actors 30, as well. For example, a given tool 20 may be instructed to perform two different activities. That is, controllers 240 implementing control to complete two different activities may issue commands to the same tool 20 at the same time to perform different functions. As another example, a given tool 20 (actor 30) may be needed at two different locations to perform functions related to two different activities. As yet another example, an operator (actor 30) may be given instructions to follow two different procedures at the same time. Even if the procedures themselves do not conflict with each other, the operator's inability to simultaneously carry out both procedures presents a conflict that must be resolved. As noted above, conflicts may also arise when a given actor 30 receives commands that are outside the capability or safety range of the actor 30 or when controllers 240 issue commands pertaining to conflicting goals for the actor 30.

Figure 3:
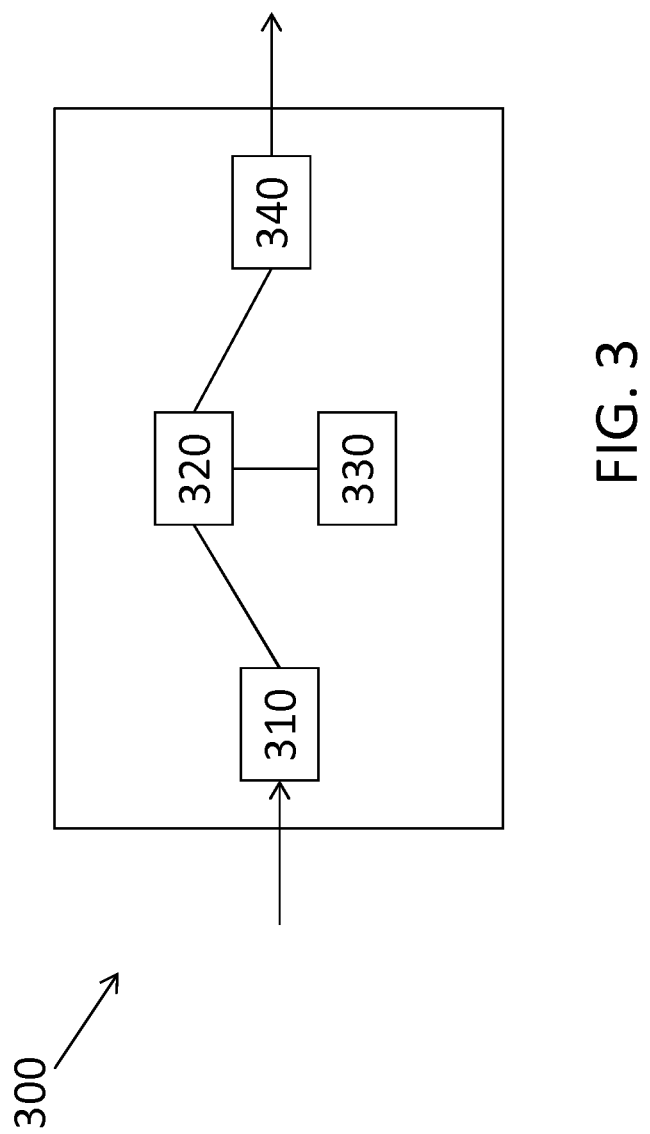
FIG. 3 is a block diagram of an exemplary conflict manager according to embodiments of the invention.

FIG. 3 is a block diagram of an exemplary conflict manager 300 according to embodiments of the invention. In terms of an overall system (e.g., the downhole system shown in FIG. 1), the conflict manager 300 resides within the interface between controllers 240 that issue commands or instructions to actors 30 and the actors 30 themselves. In alternate embodiments, the conflict manager 300 is distributed. That is, each actor 30 or a subset of actors 30 has a conflict manager 300. It bears noting that commands or instructions from a controller 240 are not limited to a single instant of time. That is, when a controller 240 seeks to control an actor 30 such as a tool 20 or application, for example, the controller 240 continues to try to control the tool 20 or application throughout the functionality of the tool 20 or application until completion of a specific task that the controller 240 wishes to achieve with the tool 20 or application. Thus, a conflict may arise at any time during that period of control and last for some or all of the duration of the functionality. Thus, while conflict management is discussed below without reference to a length of time, it should be understood that the conflict management is continuous. In the exemplary system of FIG. 1, the conflict manager 300 may be implemented as part of the downhole electronics 9, the computing system 12, or a combination of the two. Alternatively, the conflict manager 300 may be an independent system and may communicate with the downhole electronics 9 and the computing system 12. The conflict manager 300 includes an input interface 310, one or more processors 320, one or more memory devices 330, and an output interface 340. The conflict manager 300 may receive information additional to the command or instruction itself, as discussed below, in order to determine priorities, overlapping ranges, schedules.

Figure 4:
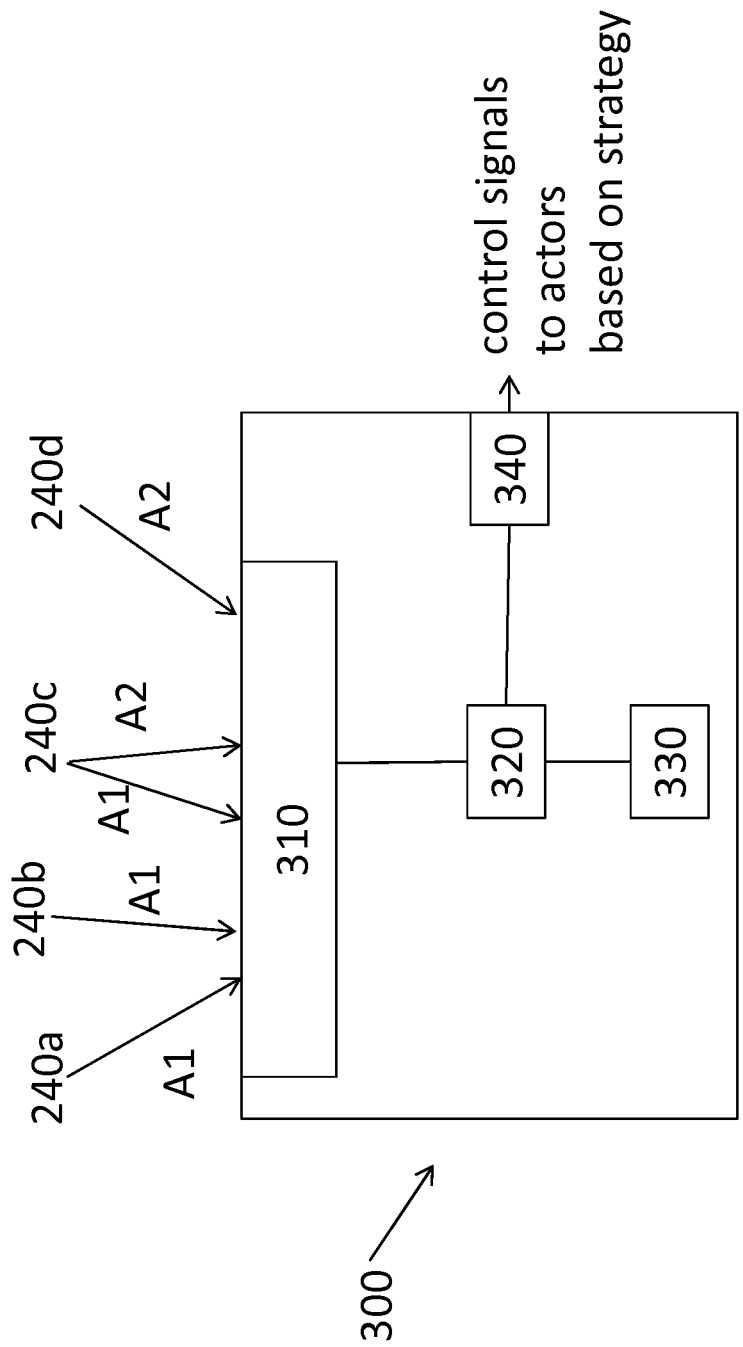
FIG. 4 is a functional flow diagram of a conflict manager according to embodiments of the invention.

FIG. 4 is a functional flow diagram of a conflict manager 300 according to embodiments of the invention. As shown in FIG. 4, four different controllers (240a-240d) are attempting to control two different actors 30 or tools 20 (are sending commands). Controllers 240a, 240b, and 240c are all trying to control tool 20 A1, and controllers 240c and 240d are both trying to control tool 20 A2. The controllers 240a-240d may be related to the same or to different activities. The controllers 240a-240d input the commands to the input interface 310 of the conflict manager 300. Additionally, the controllers 240a-240d input information to facilitate conflict management such as, for example, a desired value for control of the tool 20 (e.g., desired WOB), acceptable range (e g , minimum and maximum ROP), and information about the activity or particular task associated with the controller 240 (e.g., name, description, state such as nominal or off-nominal, and criticality of the activity with regard to safety to personnel, environment, and equipment). The processing within the conflict manager 300 may follow a strategy selected by an operator. Exemplary embodiments of strategies employed by the conflict manager 300 include dedicated control, priority control, shared control, conditional override, and timed override, as further described below.

According to the dedicated control strategy, a single controller (e.g., 240c) among the several controllers 240a-240d is selected as the dedicated controller 240 and is the only controller 240 that may control tools 20 or other actors 30. According to the priority control strategy, the higher priority command among the conflicting commands from the controllers 240 is sent. Relative priority among commands may be determined in one of several ways based on the additional information available from the controllers 240. The controllers 240 issuing conflicting commands may be associated with the same activity or with different activities. Some of the conflict resolution strategies (e.g., based on activity priority) discussed below apply to conflicting commands associated with different activities, but priority may also be specified and established between commands associated with different procedures and tasks of the same activity. For example, the information about the activity (e.g., criticality of the activity or of the originating goal, service state) may determine priority. That is, a controller 240 associated with an off-nominal state activity may have higher priority to issue commands or priority may be based on safety concerns (e.g., a safety override has priority). According to the shared control strategy, an average or weighted average, according to priority, of values in the conflicting commands from different controllers 240 may be used. In an alternate embodiment of the shared control strategy, a model may be used to estimate or predict the effect of each of the conflicting commands on physical phenomenon (e.g., vibration, formation integrity) such that a single optimized command could be shared. According to the conditional override strategy, a given controller 240 takes over dedicated control while a condition holds true, and then the strategy changes when the condition no longer holds true or another controller 240 takes over dedicated control based on another condition. According to the timed override strategy, a given controller 240 takes over dedicated control for a specified duration of time (this would be like the conditional override where the condition is a duration of time). There may be a default strategy among the strategies that holds true when a condition or timed override duration end. In alternate embodiments, commands from each of the different controllers 240 may be sequenced based on one of the strategies (e.g., priority) discussed above.

Figure 5:
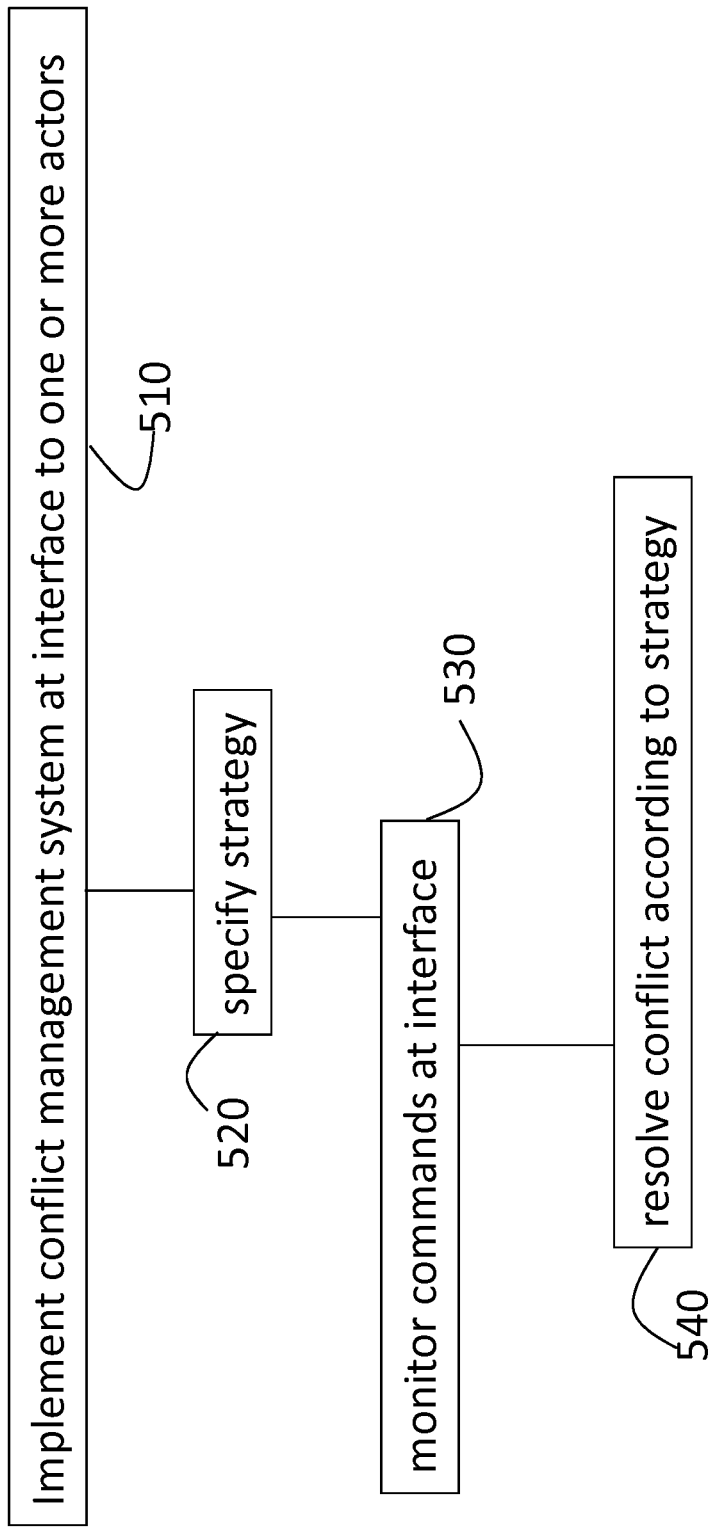
FIG. 5 is a process flow diagram of method of resolving conflicts using a conflict manager according to embodiments of the invention.

FIG. 5 is a process flow diagram of method of resolving conflicts using a conflict manager 300 according to embodiments of the invention. Implementing the conflict manager 300 at the interface to one or more actors 30, at block 510, includes ensuring that the conflict manager 300 sees all the commands issued to a single actor 30 or within a larger system (e.g., the downhole system shown in FIG. 1) or at least those commands whose potential conflicts are of interest. At block 520, specifying a strategy to be followed by the conflict manager 300 refers to the conflict manager 300 being instructed to use the dedicated control strategy, shared control strategy, or one of the other strategies discussed above. Monitoring commands at the interface (see e.g., 220 at FIG. 2), at block 520, includes the conflict manager 300 continually monitoring for conflicts to facilitate resolving conflicts according to the specified strategy at block 540.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A system, comprising:
two or more controllers configured to issue corresponding two or more commands to one or more actors to accomplish a respective activity, each of the one or more actors being a tool to be controlled based on the command, an application to be executed based on the command, or an operator to be instructed based on the command, and at least one of the two or more commands pertaining to drilling operation in a downhole environment; and
a plurality of conflict managers, each of the plurality of conflict managers being implemented by a processor and being in a one-to-one correspondence with one of the one or more actors, wherein each of the plurality of conflict managers is configured to resolve a conflict with one of the two or more commands or between the two or more commands received by the respective one of the one or more actors and at least one of the one or more actors is at a borehole and the conflict manager in the one-to-one correspondence with the at least one of the one or more actors is within the at least one of the one or more actors.

2. The system according to claim 1, wherein the conflict includes conflicting parameters issued by the two or more commands, conflicting actions defined by the two or more commands, or the one of the two or more commands issuing instructions outside a capability or safety range of one of the one or more actors.

3. The system according to claim 1, wherein the two or more controllers provide information related to the two or more commands and respective activities.

4. The system according to claim 3, wherein each of the plurality of conflict managers resolves the conflict based on the information corresponding with the two or more commands.

5. The system according to claim 1, wherein each of the plurality of conflict managers resolves the conflict based on a dedicated control strategy that includes one of the two or more controllers being designated as a designated controller.

6. The system according to claim 1, wherein each of the plurality of conflict managers resolves the conflict based on a priority control strategy that includes processing a priority command among the two or more commands based on the priority command indicating a higher priority relative to other commands among the two or more commands.

7. The system according to claim 1, wherein each of the plurality of conflict managers resolves the conflict based on a shared control strategy that includes processing a combination command derived from the two or more commands.

8. The system according to claim 1, wherein each of the plurality of conflict managers resolves the conflict based on a conditional override strategy that includes processing a command among the two or more commands associated with application controller among the two or more controllers having dedicated control based on a condition being true.

9. The system according to claim 1, wherein each of the plurality of conflict managers resolves the conflict based on a timed override strategy that includes processing a command among the two or more commands associated with application controller among the one or more controllers having dedicated control for a specified duration.

10. A method of performing conflict management in a system, the method comprising:
coupling a processor respectively to each of one or more actors in a one-to-one correspondence, each of the one or more actors being a tool to be controlled based on the command, an application to be executed based on the command, or an operator to be instructed based on the command, wherein at least one of the one or more actors is at a borehole and the processor in the one-to-one correspondence with the at least one of the one or more actors is within the at least one of the one or more actors;
identifying or more commands issued by corresponding two or more controllers to one of the one or more actors to accomplish a respective activity, wherein at least one of the two or more commands pertains to a drilling operation; and
resolving a conflict, using the corresponding processor, between the two or more commands directed to the one of the one or more actors based on a specified strategy.

11. The method according to claim 10, further comprising receiving information from the two or more controllers additional to the corresponding two or more commands.

12. The method according to claim 11, wherein the resolving the conflict is based additionally on the information.

13. The method according to claim 10, wherein the resolving the conflict based on the specified strategy includes resolving the conflict based on a dedicated control strategy including one of the two or more controllers being designated as a designated controller.

14. The method according to claim 10, wherein the resolving the conflict based on the specified strategy includes resolving the conflict based on a priority control strategy including processing a priority command among the two or more commands based on the priority command indicating a higher priority relative to other commands among the two or more commands.

15. The method according to claim 10, wherein the resolving the conflict based on the specified strategy includes resolving the conflict based on a shared control strategy including processing a combination command.

16. The method according to claim 10, wherein the resolving the conflict based on the specified strategy includes resolving the conflict based on a conditional override strategy including processing a command among the two or more commands associated with application controller among the two or more controllers having dedicated control based on a condition being true.

17. The method according to claim 10, wherein the resolving the conflict based on the specified strategy includes resolving the conflict based on a timed override strategy including processing a command among the two or more commands associated with application controller among the two or more controllers having dedicated control for a specified duration.

18. A conflict manager in a system including two or more controllers that issue corresponding two or more commands to control an actor to accomplish a respective activity, the manager comprising:

an input interface configured to receive the two or more commands to control the actor, the actor being one of a tool to be controlled based on the command or an application to be executed based on the command, wherein at least one of the two or more commands pertains to a drilling operation;

a processor configured to resolve a conflict between the two or more commands based on a specified strategy; and an output interface to the actor in a one-to-one correspondence between the conflict manager and the actor, wherein the conflict manager is located within the actor in the one-to-one correspondence and the actor is located at a borehole.

19. The manager according to claim 18, wherein the input interface additionally receives information from the two or more controllers related to the two or more commands and respective activities.

20. The manager according to claim 19, wherein the processor resolves the conflict based on the information and a specified strategy.

* * * * *